United States Patent

Shigeta (10) Patent No.: US 10,021,288 B2
(45) Date of Patent: Jul. 10, 2018

(54) DRIVE CONTROL APPARATUS FOR A LENS APPARATUS, LENS APPARATUS INCLUDING THE SAME, AND IMAGE PICKUP APPARATUS INCLUDING THE SAME

(71) Applicant: CANON KABUSHIKI KAISHA, Tokyo (JP)

(72) Inventor: Junji Shigeta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/483,009

(22) Filed: Apr. 10, 2017

(65) Prior Publication Data

US 2017/0299841 A1    Oct. 19, 2017

(30) Foreign Application Priority Data

Apr. 15, 2016 (JP) ................. 2016-081788

(51) Int. Cl.
*H04N 5/232* (2006.01)
*H04N 5/238* (2006.01)
(Continued)

(52) U.S. Cl.
CPC ........... *H04N 5/23209* (2013.01); *G02B 7/09* (2013.01); *G02B 7/282* (2013.01); *H04N 5/238* (2013.01)

(58) Field of Classification Search
CPC ...... H04N 5/23209; H04N 5/238; G02B 7/09; G02B 7/282
See application file for complete search history.

(56) References Cited

U.S. PATENT DOCUMENTS 5,999,752 A * 12/1999 Ueyama ................. G03B 7/097
  396/170
8,830,353 B2 * 9/2014 Shibuno ............ H04N 5/23209
  348/231.4
(Continued)

FOREIGN PATENT DOCUMENTS

JP    2005003968 A    1/2005
JP    2010185963 A    8/2010
(Continued)

*Primary Examiner* — Shahbaz Nazrul
(74) *Attorney, Agent, or Firm* — Rossi, Kimms & McDowell LLP (57) ABSTRACT

A drive controller for controlling driving of a movable optical member of a lens apparatus, including: a position acquirer acquiring a position of the movable optical member; an instruction inputter receiving a first driving command for driving the movable optical member from an external apparatus; and a controller determining a driving amount so that the movable optical member is driven to a position different from a position corresponding to the first driving command based on the first driving command and the position of the movable optical member every unit time, and outputs a second driving command to the lens apparatus so that the movable optical member is driven by the driving amount within the unit time, wherein the controller sets the driving amount within the unit time larger as a difference between the position corresponding to the first driving command and the position of the movable optical member becomes larger.

13 Claims, 3 Drawing Sheets

(51) Int. Cl.
*G02B 7/09* (2006.01)
*G02B 7/28* (2006.01)

(56) References Cited

U.S. PATENT DOCUMENTS

| | | |
|---|---|---|
| 8,953,090 B2 | 2/2015 | Hokkezu et al. |
| 9,172,887 B2* | 10/2015 | Yamashita ............... G03B 7/20 |
| 9,307,157 B2 | 4/2016 | Tsuda |
| 2008/0267608 A1* | 10/2008 | Kubota .................. H04N 5/232 396/374 |
| 2009/0284612 A1* | 11/2009 | Abe ....................... G03B 7/085 348/221.1 |
| 2010/0202771 A1 | 8/2010 | Moriya et al. |
| 2011/0090393 A1* | 4/2011 | Kawarada .......... H04N 5/23209 348/345 |
| 2014/0055665 A1* | 2/2014 | Tsuda .................. H04N 5/2353 348/363 |

FOREIGN PATENT DOCUMENTS

| | | |
|---|---|---|
| JP | 2013003325 A | 1/2013 |
| JP | 2014045388 A | 3/2014 |
| WO | 2013001853 A1 | 1/2013 |

* cited by examiner

DRIVE CONTROL APPARATUS FOR A LENS APPARATUS, LENS APPARATUS INCLUDING THE SAME, AND IMAGE PICKUP APPARATUS INCLUDING THE SAME

FIELD OF THE INVENTION

The present invention relates to a drive control apparatus for a lens apparatus, and more particularly, to a drive control apparatus for a lens apparatus including a movable optical member and configured to drive an optical member based on a driving command received from a camera or other such external apparatus, a lens apparatus including the same, and an image pickup apparatus including the same.

DESCRIPTION OF THE RELATED ART

There are disclosed a large number of lens-interchangeable camera systems including: a camera being an image pickup apparatus using an image pickup element, for example, a CCD sensor or a CMOS sensor; and a lens unit interchangeable with respect to the camera. There are also disclosed a large number of lens units having installed thereon a driving motor configured to drive a stop, a lens, or other such optical member and being capable of driving the optical member based on a driving command received from the camera through a signal line connected to the camera.

Meanwhile, there are various driving motors configured to drive the optical member for use in the lens unit. Therefore, there are also various kinds of operation responsiveness and stationary precision of the optical member exhibited in response to a driving command received from the camera.

When such lens units that are different in operation responsiveness and stationary precision are subjected to the same lens driving control by the camera, hunting or other such unintended movement of the optical member occurs in the lens unit that does not match the control responsiveness of the camera.

In view of the above-mentioned circumstances, for example, in Japanese Patent Application Laid-Open No. 2014-45388, there is disclosed a lens-interchangeable camera system capable of acquiring information relating to controllable responsiveness of a stop from a lens unit through communications and setting the responsiveness of the stop for the lens unit from the camera. Further, in Japanese Patent Application Laid-Open No. 2005-3968, there is disclosed a lens-interchangeable camera system configured to acquire data for movement control of a photographing lens from a lens unit and to conduct lens driving control based on the data for the movement control.

However, the system disclosed in Japanese Patent Application Laid-Open No. 2014-45388 can only be achieved in a camera including a unit configured to acquire the information relating to the responsiveness of the stop and to set the responsiveness of the stop. Further, the system disclosed in Japanese Patent Application Laid-Open No. 2005-3968 can only be achieved in a camera including a unit configured to acquire the data for the movement control of the photographing lens and to conduct the lens driving control based on the data for the movement control. Therefore, the camera that does not have the function described in Japanese Patent Application Laid-Open No. 2014-45388 or Japanese Patent Application Laid-Open No. 2005-3968 raises a problem in that optical members cannot be controlled accurately for all the lens units that are different in operation responsiveness and stationary precision.

Meanwhile, in general, when there is a large separation between a present position of the optical member and a position intended by a photographer, it is required to quickly move the optical member to the position intended by the photographer. In addition, when a moving image is photographed with the position of the optical member being close to the position intended by the photographer, it is required to prevent a photographed video from drastically changing, resulting in a discomfort video. Therefore, when the present position of the optical member is close to the position intended by the photographer, the optical member needs to be controlled so as to gradually become closer to the position intended by the photographer.

In a related-art lens unit configured to conduct proportional control relative to a difference between an intended position and a present position, such a movement of an optical member can be achieved by using a DC motor exhibiting a slow driving speed as a driving unit for a movable optical member.

However, when a motor capable of high speed driving, for example, a stepping motor, is used as the driving unit for the movable optical member, the optical member is also driven at high speed near the position intended by the photographer, which is an operation that causes a drastic change in the video obtained by photographing a moving image, and smooth driving intended by the photographer cannot be conducted.

Matters required for achieving the above-mentioned movement of the optical member suitable to photograph the moving image are not described in Japanese Patent Application Laid-Open No. 2014-45388 or Japanese Patent Application Laid-Open No. 2005-3968.

SUMMARY OF THE INVENTION

The present invention has been made in view of the above-mentioned circumstances, and has an object to provide a drive control apparatus for a movable optical member, which enables a driving movement in a lens apparatus configured to drive an optical member by a driving unit having a driving characteristic of a slow driving speed, for example, a DC motor, to be achieved also for a lens apparatus configured to drive a movable optical member by a driving unit having a driving characteristic of a fast driving speed, for example, a stepping motor.

According to one embodiment of the present invention, there is provided a drive control apparatus for controlling driving of a movable optical member of a lens apparatus, including: a position acquirer that acquires a position of the movable optical member; an instruction inputter that receives a first driving command for driving the movable optical member from an external apparatus; and a controller that determines a driving amount so that the movable optical member is driven to a position different from a position corresponding to the first driving command based on the first driving command and the position of the movable optical member every unit time, and to output a second driving command to the lens apparatus so that the movable optical member is driven by the driving amount within the unit time, in which the controller sets the driving amount within the unit time larger as a difference between the position corresponding to the first driving command and the position of the movable optical member becomes larger.

According to the present invention, it is possible to provide the drive control apparatus for the movable optical member, which enables the driving movement (movement of the optical member suitable to photograph a moving image) of the lens apparatus configured to drive the optical member by the driving unit having the driving characteristic of the slow driving speed, for example, the DC motor, to be achieved also for the lens apparatus configured to drive the movable optical member by the driving unit having the driving characteristic of the fast driving speed, for example, the stepping motor.

Further features of the present invention will become apparent from the following description of exemplary embodiments with reference to the attached drawings.

DESCRIPTION OF THE EMBODIMENTS

Now, an exemplary embodiment of the present invention is described in detail based on the attached drawings.

First Embodiment

Figure 1:
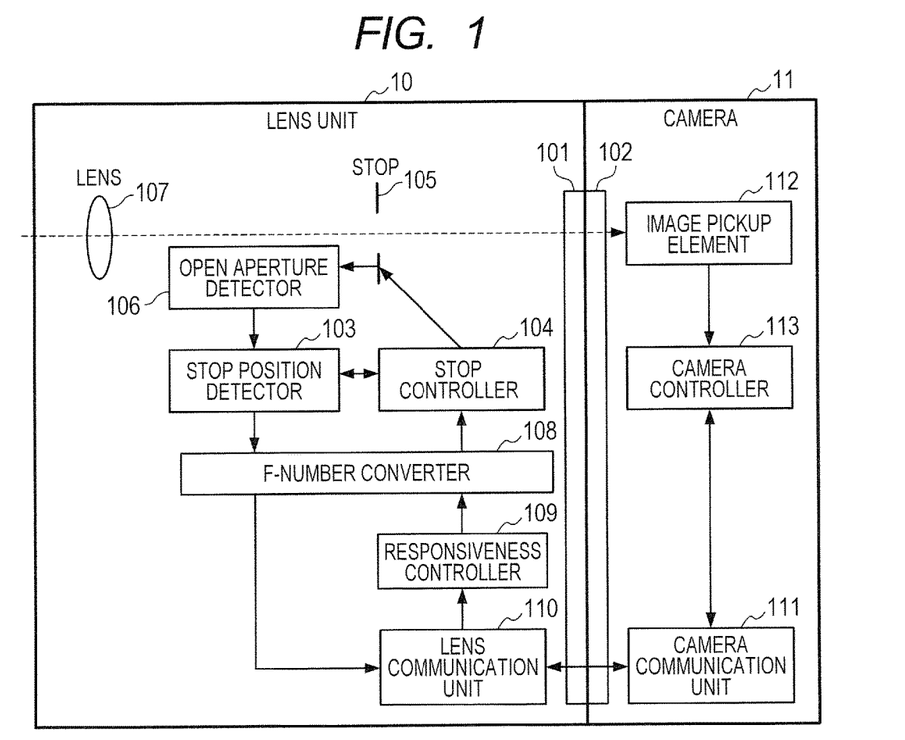
FIG. 1 is a configuration block diagram of a first embodiment of the present invention.

Now, with reference to FIG. 1, a description is made of a first embodiment of the present invention.

In this embodiment, the description is made by taking a camera and a stop as examples of an external apparatus and an optical member, respectively. First, components of this embodiment are described.

FIG. 1 is a configuration block diagram of the first embodiment. In FIG. 1, a lens unit 10 is a lens unit configured to control a movable optical member relating to photographing. A camera 11 is a camera configured to photograph a video, and is connected to the lens unit 10 through a mount 101 and a mount 102. The mount 101 and the mount 102 are provided with contact terminals for communications conducted between the lens unit 10 and the camera 11.

A stop position detector (position acquisition unit) 103 is configured to detect a stop position (opening amount) of a stop 105. A stop controller 104 is configured to change the stop position of the stop 105. The stop 105 is configured to limit an effective aperture of light entering the camera 11, and includes diaphragm blades and a stepping motor configured to drive the diaphragm blades. An open aperture detector 106 is configured to detect that the stop 105 is in an opening position, and includes a shielding plate and a photo interrupter mounted for indicating that the stop 105 is in the opening position by, for example, being turned on or off when the stop 105 is in the opening position.

A lens 107 is a lens group arranged in the lens unit 10, and light for use in the photographing passes through the lens 107 to enter the camera 11. An F-number converter 108 is a converter configured to conduct conversion between the stop position and an F-number. A responsiveness controller (controller) 109 is configured to determine (set) an F-number driving amount Fdg per unit time based on a camera F-number command value Fcc received from the camera 11.

A lens communication unit 110 and a camera communication unit 111 are communication units configured to conduct communications between the lens unit 10 and the camera 11 through the contact terminals provided to the mount 101 and the mount 102.

An image pickup element 112 is configured to receive the light of an optical image formed by the lens 107 of the lens unit 10 and to acquire a video signal through photoelectric conversion, and is formed of, for example, a CCD or a CMOS. A camera controller 113 is configured to control the camera 11.

The stop position detector 103, the stop controller 104, the F-number converter 108, the responsiveness controller 109, and the lens communication unit 110 may be, for example, provided inside a CPU of the lens unit 10 or provided independently. The camera communication unit 111 and the camera controller 113 may be, for example, provided inside a CPU of the camera 11 or provided independently.

Next, an initial operation of the lens unit 10 of this embodiment is described.

When power is supplied from the camera 11 to the lens unit 10, the lens unit 10 executes the following initial operation in order to initialize a stop position Ip of the stop 105 which is unfixed when the power is supplied.

The stop position detector 103 instructs the stop controller 104 to drive the stop 105 toward an opening direction. The stop controller 104 outputs a driving pulse signal for driving the stop 105 toward the opening direction to the stop 105 in response to the instruction received from the stop position detector 103. When the stop 105 reaches the opening position, the fact of the reaching is detected by the open aperture detector 106, and the stop position detector 103 is notified of a timing at which the stop 105 has reached the opening position. When detecting that the stop 105 reaches the opening position, the stop position detector 103 instructs the stop controller 104 to stop the driving, and requests the stop controller 104 to initialize a stop driving amount Imv. The stop controller 104 stops outputting a driving pulse, and initializes the stop driving amount Imv to 0. After that, the stop controller 104 notifies the stop position detector 103 of an integrated value of a stop driving amount Idg per unit time as the stop driving amount. Imv.

Figure 2:
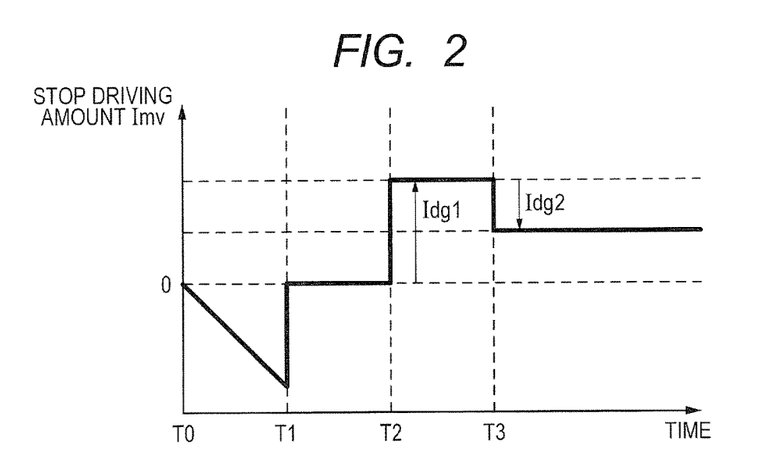
FIG. 2 is a graph for showing a change of a stop driving amount.

Now, a change of the stop driving amount Imv is described below. FIG. 2 is a graph for showing the change of the stop driving amount Imv with a lapse of time. In FIG. 2, the vertical axial direction represents the stop driving amount Imv, and a direction (positive direction) for increasing the stop driving amount Imv indicates a closing direction of the stop. The horizontal axis represents a lapse of time. T0, T1, T2, and T3 each represent a specific time. Idg1 and Idg2 each represent the stop driving amount Idg per unit time exhibited at T2 or 13, respectively.

When the lens unit 10 is powered on at T0, in response to the instruction received from the stop position detector 103, the stop controller 104 outputs the driving pulse signal to the stop 105 so as to drive the stop 105 toward the opening direction. When the value of the stop driving amount Imv is 0 at T0, because the stop 105 is moved toward the opening direction, the stop driving amount Imv is changed toward a negative direction.

When the open aperture detector 106 detects that the stop 105 is in the opening position at T1, the operation of the stop 105 is stopped, and the stop driving amount Imv to 0 is initialized.

When receiving the stop driving amount Idg1 toward the closing direction from the F-number converter 108 at T2, the stop controller 104 outputs the driving pulse corresponding to the stop driving amount Idg1 to the stop 105. The stop controller 104 further changes the stop driving amount Imv toward the positive direction by the stop driving amount Idg1.

When receiving the stop driving amount Idg2 toward the opening direction from the F-number converter 108 at T3, the stop controller 104 outputs the driving pulse corresponding to the stop driving amount Idg2 to the stop 105. The stop controller 104 further changes the stop driving amount Imv toward the negative direction from Idg1 by the stop driving amount Idg2.

As described above, after being initialized to 0 at T1, the stop driving amount Imv is obtained from the integrated value of the stop driving amount Idg per unit time received from the F-number converter 108.

In this case, the stop 105 drives the stop by the driving pulse received from the stop controller 104, and hence the stop driving amount Imv indicates the stop position of the stop 105 that is increased from the opening position of 0 (reference) toward the closing direction. Therefore, the stop position detector 103 determines the stop driving amount Imv as a present stop position Ip by regarding the stop driving amount Imv as having a value that can be handled equally to the present stop position Ip.

Figure 3:
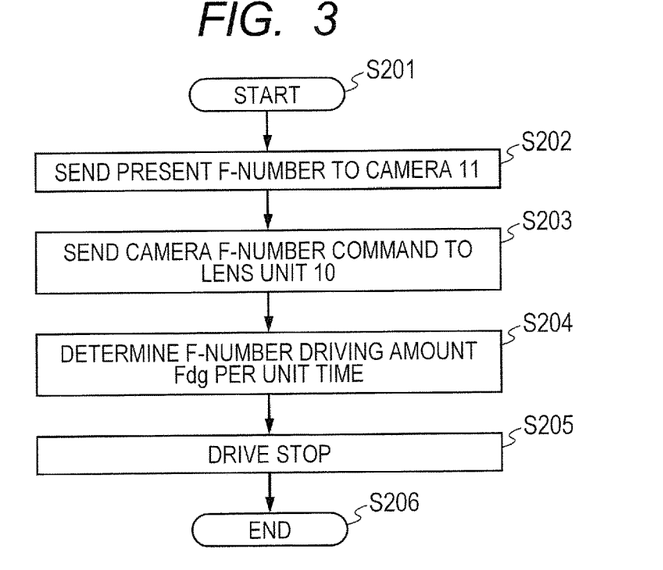
FIG. 3 is a flowchart of an operation of the first embodiment.

Next, with reference to FIG. 3, a description is made of a processing flow of drive control conducted on the stop included in a drive control apparatus for a lens apparatus according to this embodiment.

When the initialization operation of the lens unit 10 is completed after the power-on or the like, the procedure advances from Step S201 to Step S202, and based on a driving command received from the camera 11 being the external apparatus, the drive control of the stop to be subjected to the drive control is started.

In Step S202, the F-number converter 108 of the lens unit 10 determines a present F-number Fpn based on the present stop position Ip, and sends the present F-number Fpn to the camera 11 via the lens communication unit 110. Then, the procedure advances to Step S203.

In this embodiment, the stop 105 is configured so as to exhibit a linear relationship between a change amount of the stop position Ip (driving amount of stop driving apparatus) and a change amount of the number of stages of the F-number (log(F-number)). Therefore, the present stop position Ip is converted into the present F-number Fpn through use of Expression (1).

$$Fpn=\sqrt{2^{(Fpo+(Fmv \times Ip))}} \quad (1)$$

In Expression (1), Fpo represents the number of stages starting with F1.0 exhibited when the stop position Ip is 0, and Fmv represents the change amount of the number of stages exhibited when the stop position Ip is changed by 1. Fpo is a value determined by a maximum aperture of the lens unit. As Fpo and Fmv, values held in advance in the F-number converter 108 are used.

In Step S203, the present F-number Fpn output to the camera 11 is received by the camera communication unit 111 and passed to the camera controller 113. When acquiring the present F-number Fpn, the camera controller 113 starts automatic iris control as follows.

The camera controller 113 converts a video electric signal received from the image pickup element 112 into a video signal. At this time, the camera controller 113 determines the camera F-number command value (first driving command value) Fcc based on the present F-number Fpn in order to operate the stop 105 of the lens apparatus so as to cancel a change in luminance of the photographed video based on a signal indicating the luminance of the photographed video. The determined camera F-number command value Fcc is output to the lens unit 10 via the camera communication unit 111.

In Step S203, the camera F-number command value Fcc is output from the camera 11 to the lens unit 10, and then the procedure advances to Step S204.

In Step S204, the camera F-number command value Fcc is received by the lens communication unit 110 (instruction input unit) and input to the responsiveness controller 109. The responsiveness controller 109 determines the F-number driving amount (second driving command value) Fdg per unit time that defines the movement of the stop 105.

In this case, the F-number driving amount Fdg per unit time is determined as follows so that the change of the present F-number driving amount Fdg exhibits unique responsiveness relative to the camera F-number command value Fcc without depending on a driving characteristic of the stop 105.

Figure 4:
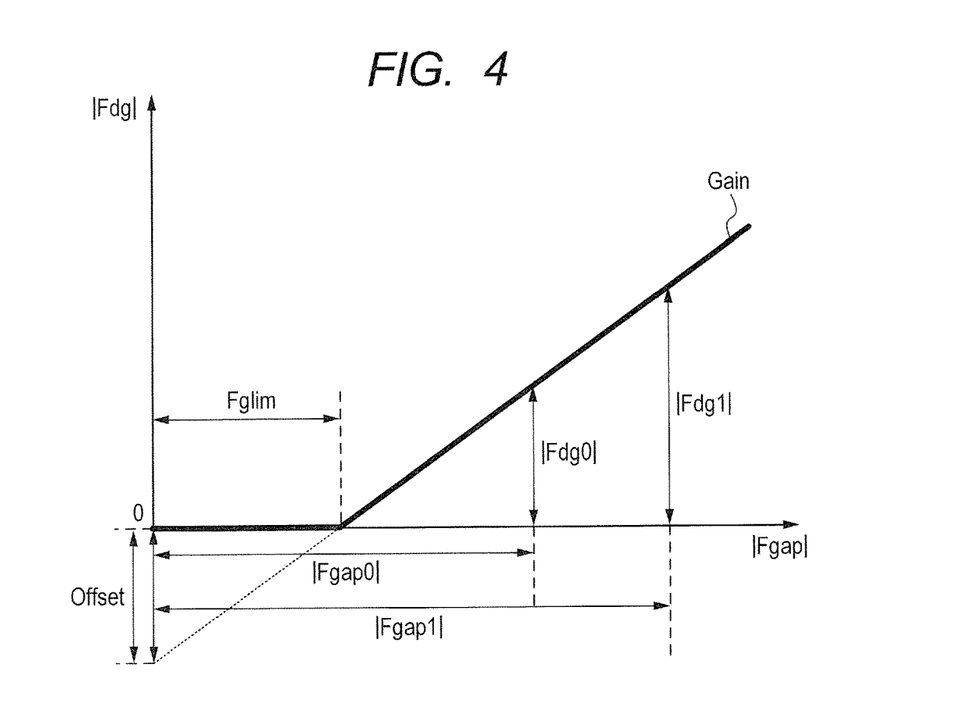
FIG. 4 is a graph for showing a relationship among a camera F-number command value, a present F-number, and an F-number driving amount per unit time.

FIG. 4 is a graph for showing a relationship between the absolute value of the F-number driving amount Fdg per unit time and the absolute value of an F-number displacement amount Fgap being a difference between the camera F-number command value Fcc and the present F-number Fpn. In FIG. 4, the vertical axis represents the absolute value of the F-number driving amount Fdg per unit time, and the horizontal axis represents the absolute value of the F-number displacement amount Fgap. In this case, the F-number displacement amount Fgap is a value representing the displacement amount of the F-number from the present F-number Fpn to the camera F-number command value Fcc as the number of stages of the F-number, and takes a positive value when the camera F-number command value Fcc is on the closed side of the present F-number Fpn and a negative value when the camera F-number command value Fcc is on the open side. The F-number displacement amount Fgap is expressed by Expression (2).

$$Fgap=\log_{\sqrt{2}}Fcc-\log_{\sqrt{2}}Fpn \quad (2)$$

In FIG. 4, the solid line (Gain) indicates a relationship between the absolute value of the F-number displacement amount Fgap and the absolute value of the F-number driving amount Fdg used for calculating the F-number driving amount Fdg per unit time from the F-number displacement amount Fgap. The solid line (Gain) is expressed by Expression (3) based on a control gain value G and a dead band amount Offset.

$$|Fdg|=|Fgap| \times G - \text{Offset} \quad (3)$$

where Fdg=0 when |Fgap|×G<Offset.

In FIG. 4, Offset represents a dead band amount, and Fglim represents a dead-band F-number displacement amount being an F-number displacement amount corresponding to the dead band amount Offset exhibited in the relationship indicated by the solid line (Gain). |Fgap1| and |Fgap2| each represent the absolute value of the F-number displacement amount Fgap exhibited at a specific timing. |Fdg0| and |Fdg1| each represent the absolute value of the F-number driving amount Fdg exhibited when the F-number displacement amount Fgap is |Fgap0| or |Fgap1|, respectively.

As shown in FIG. 4, the absolute value of the F-number driving amount Fdg per unit time is |Fdg0| when the absolute value of the F-number displacement amount Fgap is |Fgap0|, and the absolute value of the F-number driving amount Fdg per unit time is |Fdg1| when the absolute value of the F-number displacement amount Fgap is |Fgap1|.

Further, the F-number driving amount Fdg per unit time is 0 when the F-number displacement amount Fgap is equal to or smaller than the dead-band F-number displacement amount Fglim. In other words, the F-number driving amount Fdg per unit time is determined based on a value obtained by multiplying, by the control gain value G, a value obtained by subtracting the dead-band F-number displacement amount Fglim from the F-number displacement amount Fgap.

The dead-band F-number displacement amount Fglim is expressed by Expression (4) based on Expression (3).

$$F\text{glim} = \text{Offset}/G \quad (4)$$

The dead band amount Offset (or dead-band F-number displacement amount Fglim) can take a value equal to or larger than 0. When the value other than 0 is set as the dead band amount, a driving characteristic equivalent to a driving characteristic ascribable to a driving torque that always occurs in the case of conducting the proportional control by using a DC motor as a driving unit can be achieved through use of the drive control apparatus according to the embodiment of the present invention even in a case of using a stepping motor or an ultrasonic motor.

In the above-mentioned manner, the absolute value Fdg of the F-number driving amount Fdg per unit time is determined. The plus or minus sign is added to the determined |Fdg| when the sign of the F-number displacement amount Fgap per unit time is plus or minus, respectively, to thereby determine the F-number driving amount Fdg per unit time.

In Step S204, the F-number driving amount Fdg per unit time determined by the responsiveness controller 109 is output to the F-number converter 108, and the procedure advances to Step S205.

In Step S205, the lens unit 10 drives the stop 105 based on the F-number driving amount Fdg per unit time. The driving of the stop 105 is executed as follows.

The F-number converter 108 converts the F-number driving amount Fdg per unit time into the stop driving amount Idg per unit time. The stop driving amount Idg per unit time is determined by Expression (5) based on Expression (1).

$$Idg = Fdg/Fmv \quad (5)$$

When determining the stop driving amount Idg per unit time, the F-number converter 108 outputs the stop driving amount Idg per unit time to the stop controller 104. When receiving the F-number driving amount Fdg per unit time, the stop controller 104 outputs the driving pulse corresponding to the stop driving amount Idg per unit time to the stop 105. The stop 105 drives the stepping motor based on the driving pulse output from the stop controller 104, to thereby change the opening amount of the stop.

When the stop driving of the stop 105 is completed in Step S205, the procedure advances to Step S206 to complete the processing.

In the above-mentioned manner, it is possible to drive the stop so that the change of the present F-number Fpn exhibits unique (equal between different lens units) driving responsiveness and stationary precision relative to the camera F-number command value Fcc without depending on the driving characteristic of the stop 105 mounted to the lens unit.

Figure 5:
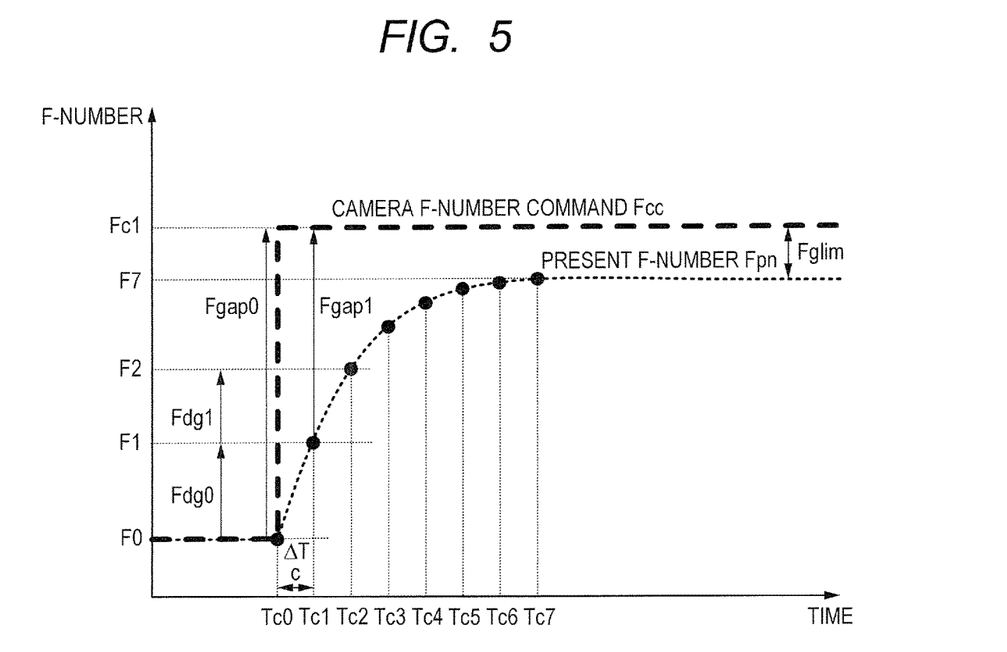
FIG. 5 is a graph for showing a change of the present F-number relative to the camera F-number command value.

Next, a description is made of a change of the F-number Fpn relative to the camera F-number command value Fcc exhibited when the stop 105 is driven based on the F-number driving amount Fdg per unit time.

FIG. 5 is a graph for showing the change of the F-number Fpn relative to the camera F-number command value Fcc exhibited when the stop 105 is driven based on the F-number driving amount Fdg per unit time. In FIG. 5, the vertical axis represents the F-number, and the horizontal axis represents a lapse of time. F0, F1, F2, F7, and Fc1 each represent an F-number, and Tc0, Tc1, Tc2, Tc3, Tc4, Tc5, Tc6, and Tc7 each represent a specific time. The unit time ΔTc indicates an interval between each pair of those times Tc0 to Tc7. Fgap0 and Fgap1 each represent the F-number displacement amount Fgap exhibited at the time Tc0 or Tc1, respectively. Fdg0 and Fdg1 each represent the F-number driving amount Fdg per unit time exhibited at Tc0 or Tc1, respectively. Fglim represents a dead-band F-number displacement amount.

When the camera F-number command value Fcc is changed from F0 to Fc1 at Tc0, the F-number driving amount Fdg0 to be driven within the unit time is calculated from Expression (3) based on the F-number displacement amount Fgap0 exhibited at Tc0, and the F-number Fpn is changed from F0 to F1 by Tc1 that arrives after ΔTc has elapsed since Tc0. Further, at Tc1, the F-number driving amount Fdg1 per unit time is calculated from Expression (3) based on the F-number displacement amount Fgap1, and the F-number Fpn is changed from F1 to F2 by Tc2 that arrives after ΔTc has elapsed since Tc1. After that, the F-number Fpn is changed with a lapse of time until Tc7 at which the F-number Fpn reaches F7. When the difference between Fc1 and F7 becomes the dead-band F-number displacement amount Fglim at Tc7, the F-number driving amount Fdg per unit time is 0 after that, and hence the stop position is stopped at F7.

As shown in FIG. 5, the operation is conducted based on the camera F-number command value Fcc at a high driving speed so that, as a discrepancy between the F-number Fpn and the camera F-number command value Fcc becomes larger, the F-number driving amount Fdg per unit time ΔTc becomes larger and the F-number becomes closer to the camera F-number command value Fcc faster. Meanwhile, the operation is conducted at a slow driving speed so that, as the discrepancy between the F-number Fpn and the camera F-number command value Fcc becomes smaller, the F-number driving amount Fdg per unit time ΔTc becomes smaller and the F-number becomes closer to the camera F-number command value Fcc slower.

Next, a description is made of a method of determining the control gain value G and the dead band amount Offset so that a lens unit using a motor exhibiting a fast driving speed as the driving unit can be driven and operated with drive controllability (responsiveness) equivalent to that of a lens unit using a motor exhibiting a slow driving speed as the driving unit. Examples of the motor exhibiting a slow driving speed include a DC motor, and examples of the motor exhibiting a fast driving speed include a stepping motor and an ultrasonic motor. The drive control apparatus according to the embodiment of the present invention is applied to the drive control of the lens apparatus employing the motor exhibiting a fast driving speed, for example, a stepping motor, as the driving unit.

The driving responsiveness and the stationary precision of the F-number Fpn relative to the camera F-number command value Fcc can be adjusted by changing the control gain value G and the dead band amount Offset as expressed in Expression (3). Therefore, it is necessary to determine the control gain value G and the dead band amount Offset that cause the control gain value G and the dead band amount Offset of the drive control apparatus according to the embodiment of the present invention to become closer to the driving responsiveness and the stationary precision (for example, such a drive curve as shown in FIG. 5) of another lens unit using the motor exhibiting a slow driving speed (DC motor).

First, a time required after the camera F-number command value Fcc output to the lens unit is changed until the F-number Fpn stops changing and a difference between the F-number Fpn that has stopped changing and the camera F-number command value Fcc are measured for another lens unit using the motor exhibiting a slow driving speed. Subsequently, the control gain value G is adjusted so that a time required after a drive start until the F-number Fpn stops changing matches the time for the another lens unit when the camera F-number command value Fcc is changed for a fast-response lens unit to be subjected to the adjustment of the driving responsiveness and the stationary precision (lens unit subjected to the drive control by the drive control apparatus according to the embodiment of the present invention) under the same condition. In addition, the dead band amount Offset is adjusted so that a difference between the camera F-number command value Fcc and the F-number Fpn matches the difference for the another lens unit.

The above-mentioned method enables the control gain value G and the dead band amount Offset to be determined so that the lens unit using the motor exhibiting a fast driving speed as the driving unit can be driven and operated with the drive controllability (responsiveness) equivalent to that of the lens unit using the motor exhibiting a slow driving speed as the driving unit.

The adjusted control gain value G and the adjusted dead band amount Offset are held in the responsiveness controller 109, and are used later for the drive control of the movable optical member.

By adjusting the control gain value G, it is possible to cause the driving characteristic of the lens unit using the motor exhibiting a fast driving speed to become closer to the driving characteristic of the lens unit using the motor exhibiting a slow driving speed. In regard to the stationary precision of the driving characteristic, the dead-band F-number displacement amount Fglim can be caused to become closer to 0 as the dead band amount Offset is caused to become closer to 0, and the drive control can be conducted with high stationary precision with respect to the drive controllability of the lens unit using the motor exhibiting a slow driving speed.

According to the embodiment of the present invention, also in the lens unit using, as the driving unit, the stepping motor exhibiting a fast driving speed having a driving characteristic of the optical member different from that of the related-art DC motor exhibiting a slow driving speed, the control responsiveness equivalent to that of the lens unit using the DC motor as the driving unit is exhibited in response to the driving command received from the camera or other such external apparatus, and it is possible to achieve the movement of the optical member equally suitable to photograph the moving image.

The description of this embodiment has been made in regard to the stop, but it is possible to obtain the same effects by conducting the same processing on another optical member, for example, a zoom lens or a focus lens. When the movable optical member is a zoom lens or a focus lens, a command value received from the camera being the external apparatus may be a focal length or an object distance, respectively.

Further, the description of this embodiment has been made by taking the camera 11 as an example of the external apparatus configured to output the driving command for the movable optical member of the lens unit, but the same effects can be obtained for a command value for another operation member, for example, a remote controller or a demand, connected to the lens unit 10.

Further, the lens apparatus and an image pickup apparatus that enjoy the action and effect of the present invention can be achieved by the lens apparatus including the drive control apparatus employed in the lens unit according to the embodiment of the present invention and also the image pickup apparatus including the camera apparatus including the image pickup element configured to receive the light of an optical image formed by the lens apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-081788, filed Apr. 15, 2016, which is hereby incorporated by reference herein in its entirety.

What is claimed is:

1. A drive control apparatus for controlling driving of a movable optical member of a lens apparatus, comprising:
   a position acquirer that acquires a position of the movable optical member;
   an instruction inputter that receives a first driving command for driving the movable optical member from an external apparatus; and
   a controller that determines a driving amount so that the movable optical member is driven to a position different from a position corresponding to the first driving command based on the first driving command and the position of the movable optical member every unit time, and outputs a second driving command to the lens apparatus so that the movable optical member is driven by the driving amount within the unit time,
   wherein the controller causes the driving amount within the unit time to become larger as a difference between the position corresponding to the first driving command and the position of the movable optical member becomes larger.

2. The drive control apparatus for a lens apparatus according to claim 1, wherein the controller determines the driving amount based on a value obtained by subtracting a dead band amount equal to or larger than 0 from a value obtained by multiplying the difference by a control gain.

3. The drive control apparatus for a lens apparatus according to claim 2, wherein the dead band amount is set to 0.

4. A lens apparatus comprising a drive control apparatus for controlling driving of a movable optical member, the drive control apparatus comprising:
   a position acquirer that acquires a position of the movable optical member;
   an instruction inputter that receives a first driving command for driving the movable optical member from an external apparatus; and
   a controller that determines a driving amount so that the movable optical member is driven to a position different from a position corresponding to the first driving command based on the first driving command and the position of the movable optical member every unit time, and outputs a second driving command to the lens apparatus so that the movable optical member is driven by the driving amount within the unit time,
   wherein the controller causes the driving amount within the unit time to become larger as a difference between the position corresponding to the first driving command and the position of the movable optical member becomes larger, wherein the controller determines the driving amount based on a value obtained by subtracting a dead band amount equal to or larger than 0 from a value obtained by multiplying the difference between the position corresponding to the first driving command and the position of the movable optical member by a control gain, and wherein the dead band amount is set to 0.

5. The lens apparatus according to claim 4, wherein the movable optical member is driven by one of a stepping motor and an ultrasonic motor.

6. The lens apparatus according to claim 5, wherein the controller determines a driving amount for each unit time so as to drive the movable optical member by the driving amount, which is obtained by subtracting the dead band amount from the difference based on a driving characteristic of another lens apparatus for driving the movable optical member through use of a driving unit exhibiting a slow driving speed under a condition of a position corresponding to the first driving command and the position of the movable optical member, within a time equivalent to a time for the driving characteristic of the another lens apparatus.

7. The lens apparatus according to claim 6, wherein the dead band amount and the control gain are determined based on the driving characteristic of the another lens apparatus which drives the movable optical member through use of a DC motor.

8. The lens apparatus according to claim 7, wherein the dead band amount is determined based on a difference between the position corresponding to the first driving command of the another lens apparatus configured to drive the movable optical member through use of the DC motor and a position at which the movable optical member is driven and stopped based on the first driving command.

9. The lens apparatus according to claim 7, wherein the control gain is determined so that a time required after a drive start until a drive end in a case of driving the movable optical member of the lens apparatus becomes equivalent to a time required by the another lens apparatus which drives the movable optical member through use of the DC motor after a drive start until a drive end.

10. The lens apparatus according to claim 4, wherein:
the movable optical member comprises a stop; and
the first driving command comprises an F-number.

11. The lens apparatus according to claim 4, wherein:
the movable optical member comprises a zoom lens; and
the first driving command comprises a focal length.

12. The lens apparatus according to claim 4, wherein:
the movable optical member comprises a focus lens; and
the first driving command comprises an object distance.

13. An image pickup apparatus, comprising:
a lens apparatus comprising a drive control apparatus for controlling driving of a movable optical member, the drive control apparatus comprising:
a position acquirer that acquires a position of the movable optical member;
an instruction inputter that receives a first driving command for driving the movable optical member from an external apparatus; and
a controller that determines a driving amount so that the movable optical member is driven to a position different from a position corresponding to the first driving command based on the first driving command and the position of the movable optical member every unit time, and outputs a second driving command to the lens apparatus so that the movable optical member is driven by the driving amount within the unit time, wherein the controller causes the driving amount within the unit time to become larger as a difference between the position corresponding to the first driving command and the position of the movable optical member becomes larger, wherein the controller determines the driving amount based on a value obtained by subtracting a dead band amount equal to or larger than 0 from a value obtained by multiplying the difference between the position corresponding to the first driving command and the position of the movable optical member by a control gain, and wherein the dead band amount is set to 0; and a camera apparatus, which comprises an image pickup element that receives light of an optical image formed by the lens apparatus, and outputs the second driving command to the drive control apparatus for the lens apparatus.

* * * * *